United States Patent [19]

Ty Tan et al.

[11] Patent Number: 5,004,313
[45] Date of Patent: Apr. 2, 1991

[54] LOW LOSS, LOW DISPERSION VELOCITY-MATCHED TRAVELLING WAVE MODULATOR

[75] Inventors: Michael R. Ty Tan, Mountain View; Shih-Yuan Wang, Palo Alto, both of Calif.

[73] Assignee: Hewlett-Packard Company, Palo Alto, Calif.

[21] Appl. No.: 280,101

[22] Filed: Dec. 1, 1988

[51] Int. Cl.$^5$ .......................... G02B 6/10; G02F 1/01
[52] U.S. Cl. .................................. 350/96.14; 350/355; 350/96.12
[58] Field of Search .................. 350/96.12, 96.14, 355, 350/356

[56] References Cited

U.S. PATENT DOCUMENTS

| | | | |
|---|---|---|---|
| 4,005,927 | 1/1977 | Canton | 350/96.14 |
| 4,380,364 | 4/1983 | Marcatili | 350/96.14 |
| 4,693,549 | 9/1987 | Cheo | 350/96.14 |
| 4,832,430 | 5/1989 | Tada et al. | 350/96.14 |

OTHER PUBLICATIONS

Hasegawa et al., "Properties of Microstrip Line on Si-SiO$_2$ Systems", IEEE Trans. Microwave Theory & Tech., vol. MTT-19, No. 11, pp. 864–881, 1971.

M. Nazarathy, D. W. Dolfi and R. L. Jungerman, "Velocity Mis-Match Compensation in Travelling Wave Modulators Using Pseudorandom Switched Electrode Patterns", J. Opt. Soc. Amer., vol. 4, pp. 1071–1079, 1987.

H. Guckel, P. A. Brennan and I. Palocz, "A Parallel-Plate Waveguide Approach to Micro-Miniaturized, Planar Transmission Lines for Integrated Circuits", IEEE Trans. Microwave Theory and Tech., vol. MTT-15, No. 8, pp. 468–476, 1967.

*Primary Examiner*—Eugene R. LaRoche
*Assistant Examiner*—Michael B. Shingleton

[57] ABSTRACT

A travelling wave modulator that modulates the phase velocity of an electromagnetic travelling wave in response to travelling wave electrical signal travelling parallel to the electromagnetic wave. The physical parameters of various layers in the modulator are selected to optimize a figure of merit of the modulator. Suitable figures of merit are bandwidth, bandwidth to voltage $V_\pi$ ratio and difference in velocity between the electrical signal and the electromagnetic travelling wave.

8 Claims, 8 Drawing Sheets

LOW LOSS, LOW DISPERSION VELOCITY-MATCHED TRAVELLING WAVE MODULATOR

FIELD OF THE INVENTION

This invention relates in general to travelling-wave electrooptic modulators and more particularly to such a modulator in which the phase velocities of the electrical and optical signals are substantially matched. In the Figures, the first digit of each reference numeral for an element will indicate the first figure in which that element is presented.

BACKGROUND OF THE INVENTION

In FIG. 1 is shown a cross-section of a conventional microstrip p-i-n travelling-wave microstrip electrooptic modulator. In such a modulator, an optical signal is transmitted within a region 10 formed in an electrooptic material such as not intentionally doped gallium-arsenic (GaAs) layer 11. In order to trap the optical beam within this electrooptic layer, this layer is sandwiched between a pair of layers (such as p-AlGaAs buffer 12 and n-AlGaAs buffer 13) having a smaller index of refraction than electrooptic layer 11. Thus, layer 11 functions as an optical waveguide. As a result of the electrooptic behavior of layer 11, the phase velocity of an optical beam in this waveguide is modified by an electric field applied in the waveguide. This velocity modification results in a phase shift in the optical signal exiting this waveguide. Therefore, the optical signal is phase modulated by the applied electric field.

The electric field in electrooptic layer 11 is produced by a voltage difference between a pair of electrodes 14 and 15. In a travelling wave modulator, the voltage difference between electrodes 14 and 15 is produced by a travelling wave electrical signal in electrode 14. This electrical signal is typically in the microwave range of frequencies.

In an ideal travelling wave modulator, the travelling wave electrical signal travels in electrode 14 with the same velocity as the optical signal travels in waveguide 11 so that any given part of the optical beam experiences a constant electric field as it travels along waveguide 11. Unfortunately, in general, the electrical signal in electrode 14 has a different phase velocity than the optical beam. As a result of the relative velocity between the electrical and optical signals, the phase modulation of any given point of the optical beam is proportional to the time integral of the electric field that it experienced during its transit through waveguide 11. This limits the bandwidth of the modulator. Therefore, to increase the bandwidth of such travelling wave modulators, it is necessary to increase the match between the electrical and optical signal velocities.

Numerous methods have been tried to deal with this natural mismatch of velocities. In one method (see, for example, M. Nazarathy, et al, "Velocity mis-match compensation in travelling wave modulators using pseudorandom switched electrode patterns", J. Opt. Soc. Amer., vol 4, pp. 1071-1079, 1987), there is no attempt to match velocities, but instead a mechanism is provided to compensate for the effects of the runoff of one of these waves relative to the other. In this method, the electrodes 14 and 15 are configured so that the polarity of the electric field through the waveguide alternates spatially along the waveguide in accordance with a pseudorandom code. These polarity reversals and some associated electronics enables a substantial compensation for the runoff of one of these signals relative to the other.

In another method (see, K. Kawano, et al, "High Speed and low driving power Ti:LiNbO$_3$ Mach-Zehnder Optical Modulator at 1.5 micron wavelength, IEEE Lasers and Electro-optics Society 1988 Annual meeting, Nov. 1988 in Santa Clara, paper OEG.5), extra layers are added having an index of refraction selected to speed up or slow down one or the other of these signals. This method has been able to achieve substantial equality between these two velocities by moving the electrode away from the optical waveguide, but this results in a substantial increase in $V_\pi$ (the halfwave voltage). Such an increase in $V_\pi$ produces a substantial increase in power requirements which increase as the square of $V_\pi$. If these two velocities could be substantially matched, then the bandwidth of the modulator would be substantially infinite. Thus, it would be very advantageous to have a travelling wave electrode design that would enable the phase velocity of the electrical travelling wave to be matched to the phase velocity of the optical signal without significantly increasing $V_\pi$.

The travelling wave modulator of FIG. 1 also exhibits an undesirably large amount of attenuation of the electrical signal. Because electrodes 14 and 15 are on opposite sides of a substrate 16, the distance $d_1$ between these electrodes is too large for the characteristic impedance between these electrodes to equal the standard impedance of 50 ohms. Therefore, substrate 16 is sufficiently heavily doped that it is sufficiently conductive that the effective distance between electrode 14 and the ground plane is $d_2$. Unfortunately, in order for the top surface of substrate 16 to function as the ground plane, a conduction current must travel from electrode 15 through substrate 16 to its top surface 17. Since this n+ region is still significantly resistive, it introduces an undesirable amount of attenuation of the electrical signal. Thus, an alternative design should also overcome this problem.

SUMMARY OF THE INVENTION

A travelling wave modulator structure is presented in which the phase velocities of the electrical and optical signals are substantially equal. The electrical signal generates an electrical field between a first electrode and a second electrode, both of which are formed on the same side of a substrate as is formed a waveguide consisting of an electrooptic layer sandwiched between a pair of buffer layers of lower index of refraction. This configuration avoids the production of a vertical conduction current through the substrate and therefore significantly reduces the attenuation of the electrical signal. The electrodes are formed on a substrate containing at least one layer of noninsulating material, the conductivity of which can be varied to optimize the degree of match between the phase velocities of the optical and electrical signals. The widths, thicknesses, conductivities and indices of refraction of various layers of the modulator are selected to maximize a travelling wave modulator figure of merit, such as the bandwidth to $V_\pi$ ratio. This optimization is achieved by substantially matching the phase velocities of the modulator's optical and electrical signals.

DESCRIPTION OF THE PREFERRED EMBODIMENT

Figure 2:
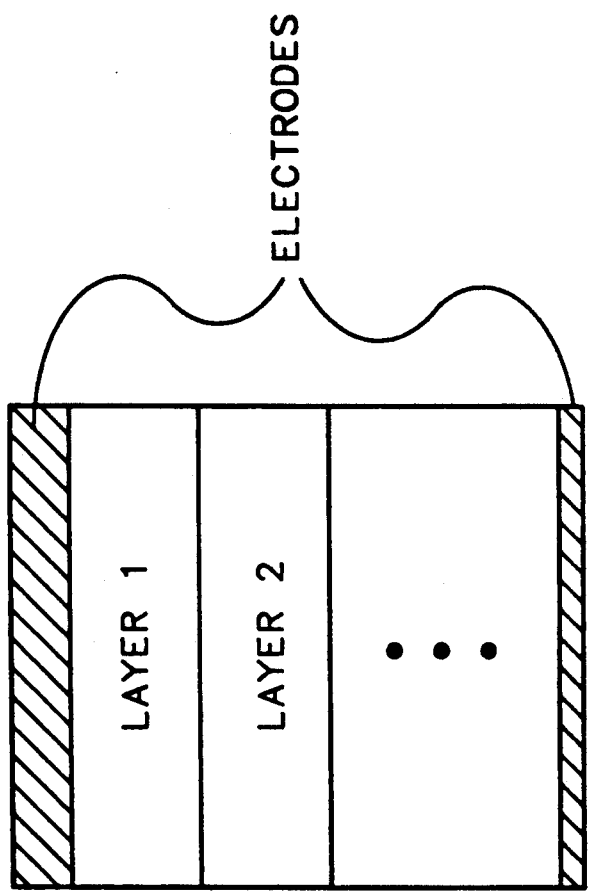
FIG. 2 is a parallel plate model of a travelling wave electrooptic modulator.
Figure 3A:
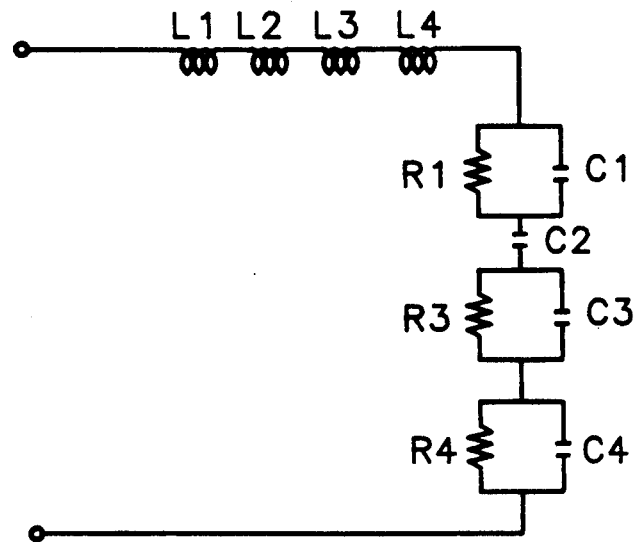
FIG. 3A is the equivalent circuit of the model of FIG. 2.

In order to produce an improved travelling wave electrooptic modulator in which the phase velocities of the electrical and optical signals are substantially equal, it is helpful to model these devices. These modulators are all multilayer devices that can be represented by the multiplate model of FIG. 2. For the case of a p-i-n on n+ substrate waveguide, the equivalent circuit is shown in FIG. 3A, where $L_k$, $R_k$ and $C_k$ are, respectively, the inductance per unit length, the resistance per unit length and the capacitance per unit length of the kth layer and where the 1st, 2nd, 3rd and 4th layers are respectively the p, i, n and n+ layer. The resistance per unit length of the intrinsic layer is sufficiently high that it can be omitted from the equivalent circuit in FIG. 3A.

Figure 3B:
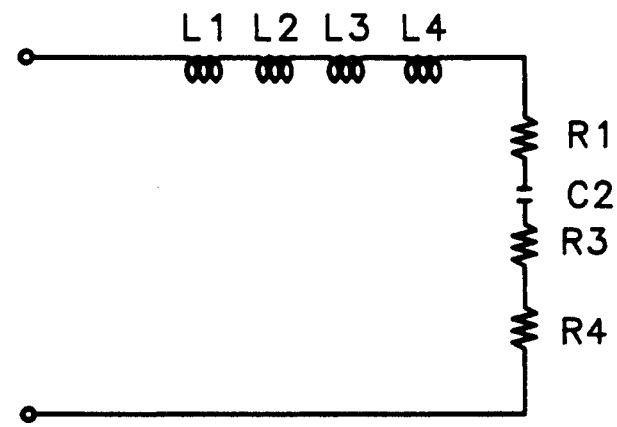
FIG. 3B is the low frequency case of the circuit of FIG. 3A.
Figure 3C:
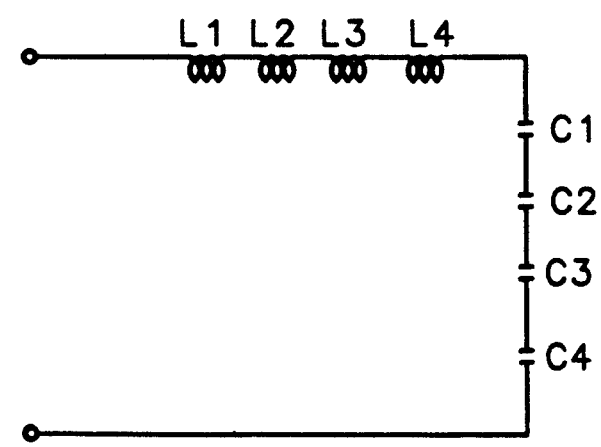
FIG. 3C is the high frequency case of the circuit of FIG. 3A.

In the low frequency limit in which each of the capacitive impedances is much larger than its parallel resistive impedances, the equivalent circuit of FIG. 3A can be approximated by the circuit of FIG. 3B. For this circuit, the phase velocity is $(L_s C_2)^{-\frac{1}{2}}$ where $L_s$ is the series equivalent inductance $L_1+L_2+L_3+L_4$ of the four inductors of FIGS. 3A-3C. In the high frequency limit in which each of the capacitive impedances is much smaller than its parallel resistive impedances, the equivalent circuit of FIG. 3A can be approximated by the circuit of FIG. 3C. For this circuit, the phase velocity is $(L_s C_s)^{-\frac{1}{2}}$, where $C_s$ is the equivalent capacitance $(C_1^{-1}+C_2^{-1}+C_3^{-1}+C_4^{-1})^{-1}$ of the series combination of capacitors $C_1$, $C_2$, $C_3$ and $C_4$. Since $C_s$ is much less than $C_2$, the phase velocity of the low frequency signals is much less than the phase velocity of the high frequency signals. This low frequency slowing effect for simple microstrips is discussed extensively in Hideki Hasegawa et al, "Properties of microstrip line on Si-SiO2 system", IEEE Transactions on Microwave Theory and Techniques, vol. MTT-19, No. 11, p. 869 (Nov. 1971) and in Henry Guckel et al, "A parallel-plate waveguide approach to micro-miniaturized, planar transmission lines for integrated circuits", IEEE Transactions on microwave theory and techniques, vol. NTT-15, No. 8, p. 468 (Aug. 1967).

Figure 1:
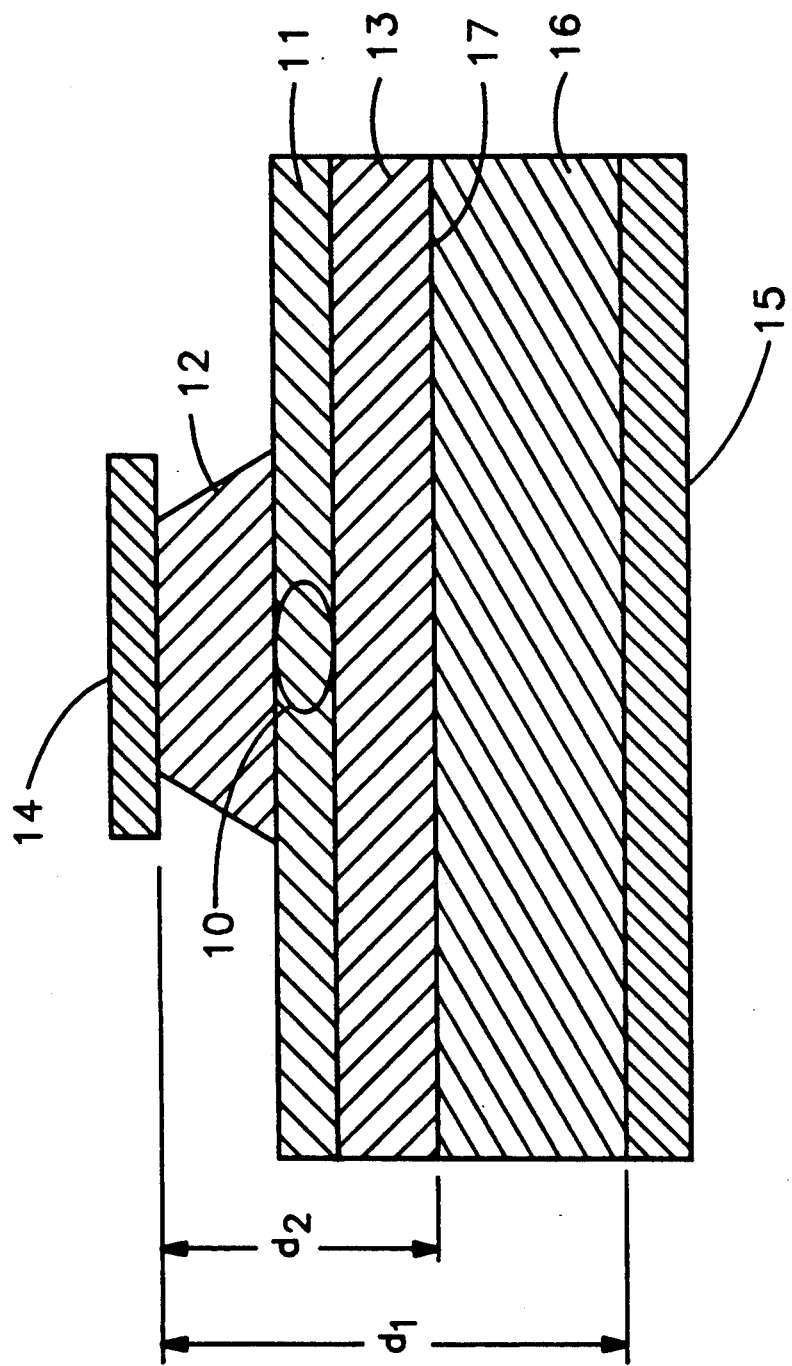
FIG. 1 is a cross-sectional view of a conventional travelling wave electrooptic modulator.

In travelling wave electrooptic modulators as in FIG. 1, the low frequency slowing means that the microwave electrical signal between electrode 14 and electrode 15 travels in dielectric regions 11-13 and 16 at a slower velocity than does an optical signal. This tends to make the microwave electrical signal travel slower than the optical signal. On the other hand, the optical beam travels only in dielectric layer 11, whereas part of the microwave electric field between electrode 14 and electrode 15 is in the ambient atmosphere surrounding the modulator. This tends to make the microwave electrical signal travel faster than the optical signal. Therefore, in some travelling wave electrooptic modulators the electrical signal is faster than the optical signal and in others it is slower. However, in existing modulators, they do not have the same velocity.

In accordance with the present invention, the relative velocity between the electrical and optical signals is adjusted to be substantially zero by selecting the physical parameters of the various layers of the modulator. Such parameters as the layer thickness, layer lateral dimensions, and layer conductivity are selected to make this relative velocity substantially equal zero.

Figure 4:
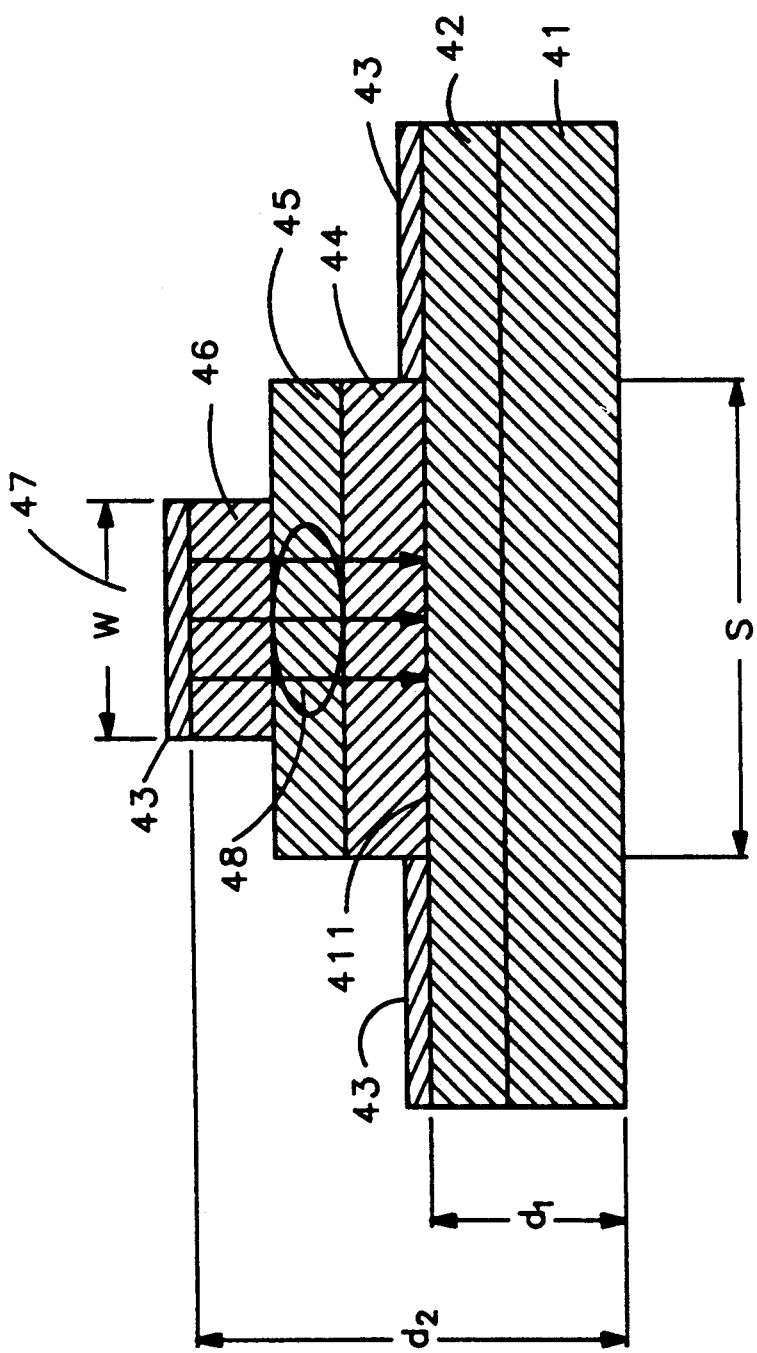
FIG. 4 is a travelling wave electrooptic modulator in which the phase velocities of the electrical and optical signals are substantially matched.

In FIG. 4 is presented a travelling wave electrooptic modulator having greatly improved frequency dependence of loss and microwave index compared to the conventional travelling wave electrooptic modulator of FIG. 1. This modulator consists of a substrate 41, a doped layer 42, an electrode pair 43, a first buffer layer 44, a waveguide layer 45, a second buffer layer 46 and a second electrode 47. By placing the electrode pair 43 on the same side of the substrate as the second electrode 47, the spacing between the second electrode 47 and the electrode pair 43 can be selected to produce a standard value of characteristic impedance (e.g., 50 ohms).

Buffer layers 44 and 46 are selected to have a lower index of refraction than waveguide layer 45 to trap an optical beam in this layer. The width W of layer 46 is selected to be less than the width S of layer 44 so that the optical beam is confined to a region 48 that is separated sufficiently from the edges of the device that the fringing field of the optical beam does not extend outside of the modulator. In this embodiment, the optical beam is transmitted in region 48 of waveguide layer 45 in a direction perpendicular to the plane of this figure. A travelling wave voltage difference between electrode 47 and electrode pair 43 travels parallel to the optical beam. Substrate 41 can be either doped or semiinsulating. When this modulator is to be integrated with other electronics, the substrate is generally selected to be semiinsulating. Layer 42 is selected to be n+ so that it and electrodes 43, in conjunction, function as a ground plane that extends below region 44. This draws the electric field lines substantially vertically through waveguide layer 45, thereby increasing the strength of the electric field within region 48. This reduces the magnitude $V_\pi$ of the voltage needed to achieve a phase change of $\pi$ in the optical output signal. At the microwave frequencies typically utilized in travelling wave modulators, the current carried by n+ layer 42 is substantially confined to a surface current at surface 411 of layer 42. By locating electrodes 43 on the same side of substrate 41 as electrode 47, the current carried by layer 42 is no longer forced to pass across such layer as is the case in FIG. 1. This reduces the attenuation of the electrical signal compared to the attenuation in the prior art embodiment of FIG. 1. The reduction of the frequency dependence of the loss as well as the overall magnitude reduces the dispersion of the microwave signal.

For the following reasons, the placing of the ground electrode pair 43 on top of the substrate greatly reduces the overall magnitude as well as the frequency dependence of the decay constant of the electrical signal.

The physical parameters of layers 41-42 and 44-46, such as the conductivity, thickness and lateral dimensions of these semiconducting layers, are selected to optimize the performance of the modulator. By optimizing is meant that some performance parameter is optimized. For this modulator, a suitable parameter is the ratio of the bandwidth to the voltage $V_\pi$. This ratio should be as large as possible. To a large extent, this optimization is achieved by minimizing the velocity difference between the microwave electrical signal and the optical signal over the range of microwave and optical frequencies of interest.

In the embodiment of FIG. 4, the phase velocity $v_m$ of the microwave modulating signal and the phase velocity $v_o$ optical signal can be adjusted to be substantially equal by proper choices of thickness and conductivity of each of layers 41-42 and 44-46. The main adjustment in the relative velocities between the electrical and optical signals is achieved by locating of electrodes 43 on the same side of substrate as electrode 47 and by utilizing a semiinsulating substrate 41.

For the particular embodiment in which layers 41-42 and 44-46 are selected respectively to be semi-insulating gallium arsenide, gallium arsenide, n-doped aluminum gallium arsenide GaAs and undoped or lightly doped n-or p- aluminum gallium arsenide the layer parameters that yield substantial equality between $v_o$ and $v_m$ are presented in the following table.

| Layer # | microstrip width W = 8 microns slot width S = 26 microns | | |
|---|---|---|---|
| | Thickness | $\epsilon_R$ | Conductivity |
| 41 | 250 | 12.85 | $10^{-6}$ |
| 42 | 2.0 | 12.85 | $5 \times 10^4$ |
| 44 | 2.7 | 12.85 | $5.88 \times 10^3$ |
| 45 | 3.3 | 12.85 | 0 |
| 46 | 2.7 | 12.85 | 0 | where the thickness is in microns, where $\epsilon_R$ equals the square of the index of refraction for the electrical signal and where conductivity is in ohm$^{-1}$m$^{-y}$.

Figure 5:
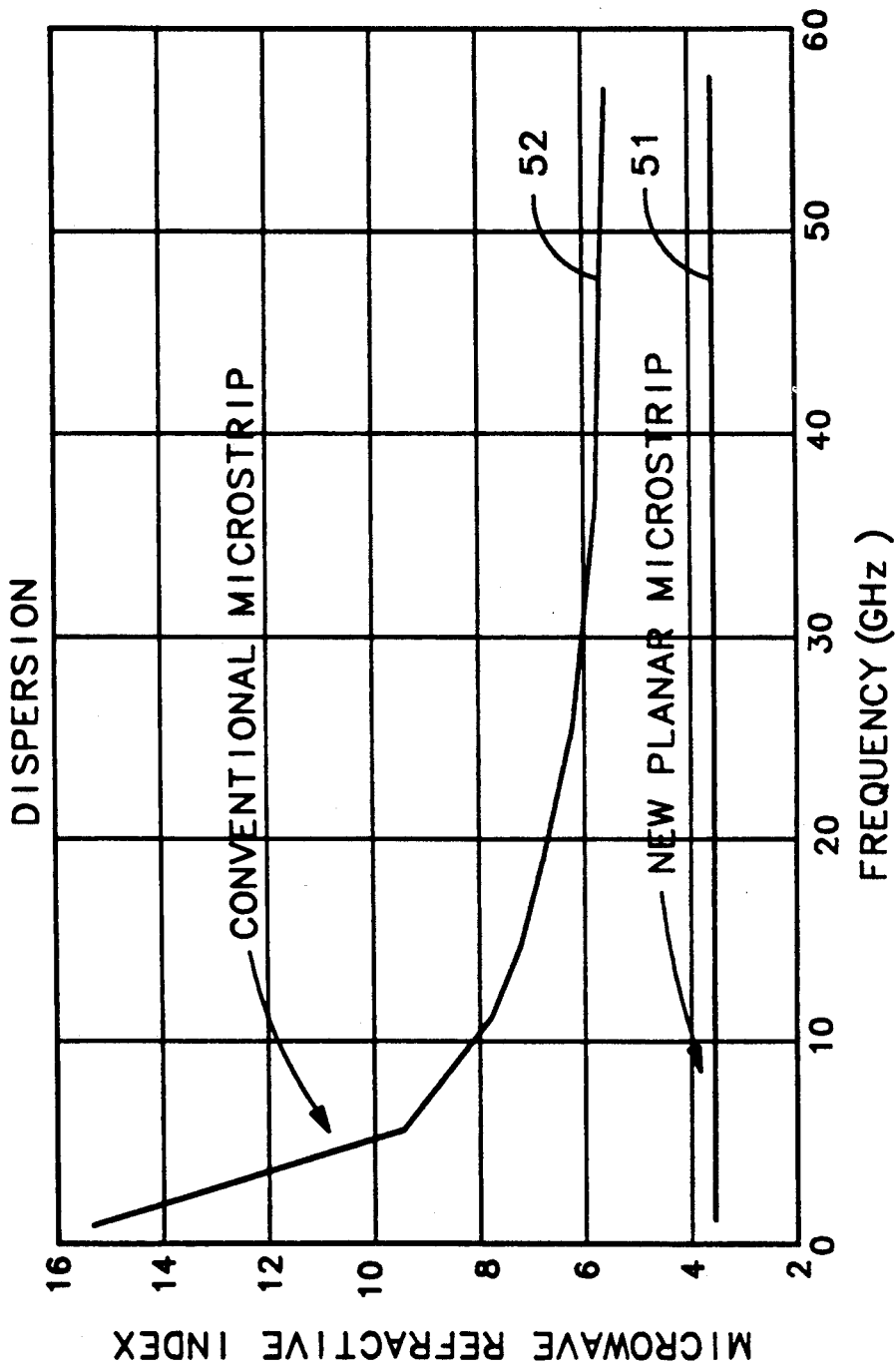
FIG. 5 shows the improved dependence of microwave index on frequency for the embodiment of FIG. 4 compared to the conventional embodiment of FIG. 1.
Figure 6:
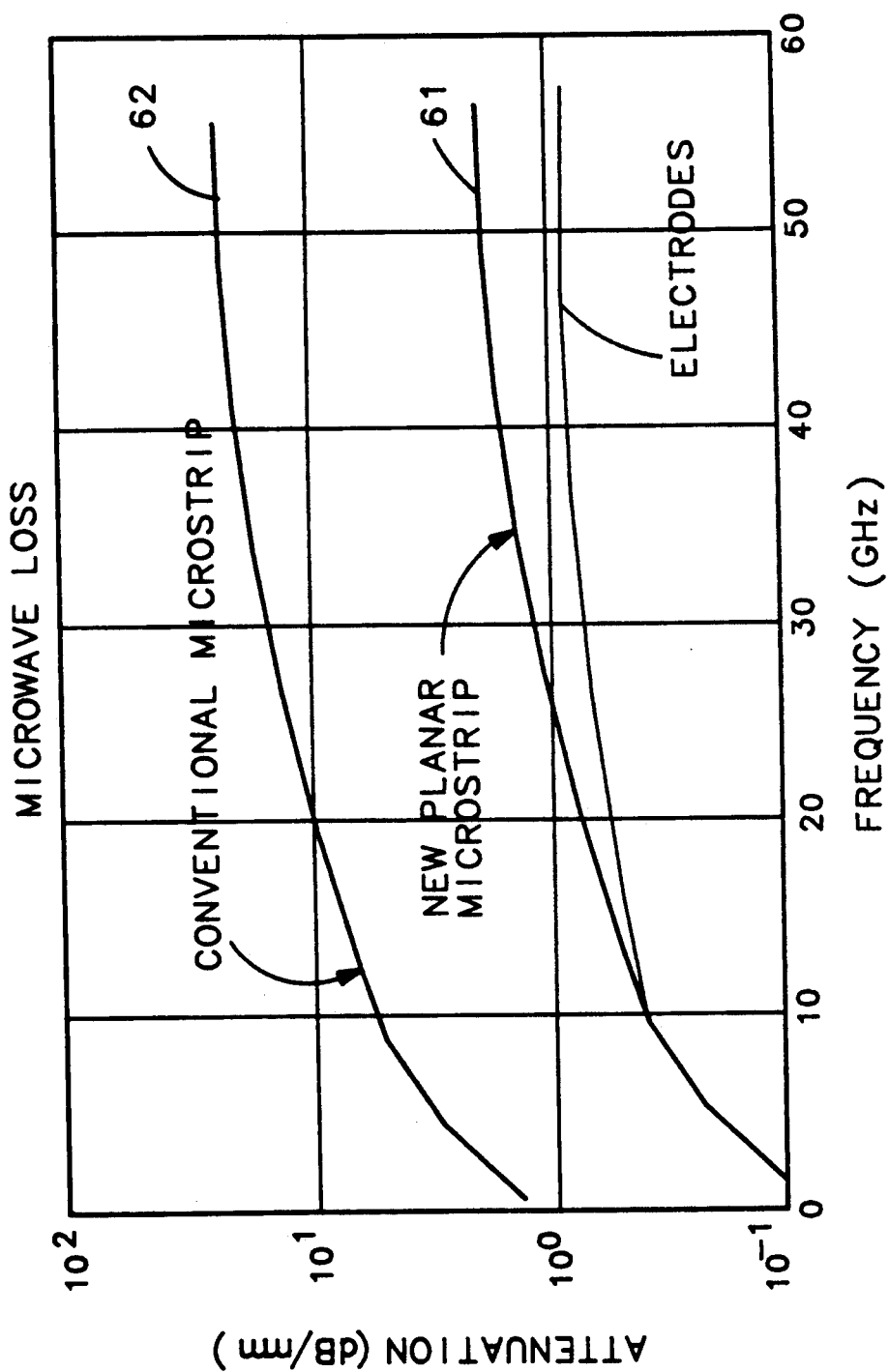
FIG. 6 shows the improved dependence of loss on frequency for the embodiment of FIG. 4 compared to the conventional embodiment of FIG. 1.

For this choice of parameters, this travelling wave modulator exhibits the dispersion relations shown by curve 51 in FIG. 5. Also shown in this Figure is the corresponding curve 52 for the conventional microstrip configuration of FIG. 1. It is clear from this figure that this new microstrip configuration produces substantially zero dispersion over the 60 GHz range presented in that Figure. FIG. 6 compares the propagation loss of the embodiments of FIGS. 1 and 4. This Figure shows that the attenuation (curve 61) for the embodiment of FIG. 4 is not only much less at each frequency than that for the conventional embodiment of FIG. 1 (curve 62), it is also less over the entire 60 GHz range presented in that figure than the minimum attenuation of curve 62.

In this embodiment, maximization of the bandwidth/$V_\pi$ ratio results in a velocity difference between the optical and electrical signals of about 3%. At the point of equality between the optical and electrical signal velocities, the dopant concentration of layer 42 is low enough that losses dominate the bandwidth and reduce the bandwidth below its maximum possible value.

The following considerations entered into the selection of the above values. The thickness of guide layer 45 is generally kept in the range of 1.6-3 microns so that light in this waveguide can couple efficiently into a typical single mode fiber. Since this thickness is therefore substantially kept constant, the value of $V_\pi$ will depend on how strongly the electric field can be directed through the optical region 48. The conductivity of layer 42 can be selected to be large enough so that this embodiment exhibits substantially the same value of $V_\pi$ as is exhibited by the embodiment of FIG. 1. Therefore, maximization of the figure of merit bandwidth/$V_\pi$ involves substantially maximization of the bandwidth.

Buffer layers 44 and 46 need to be thick enough that the evanescent field of the optical beam does not penetrate into either electrode 47 or doped layer 42, since it would lead to subtantial optical attenuation if this occurs. These layers are therefore selected to be on the order of 1 micron if the aluminum content of the AlGaAs is on the order of 10% and will be as thick as about 3 microns if this concentration of aluminum is lower. This aluminum concentration affects the index of refraction of the buffer layers and therefore affects their degree of confinement of the optical beam. The aluminum concentration is generally kept below 10% to avoid producing a multiple mode waveguide in layer 45.

The width W is selected to be on the order of the desired beam width. The slot width S is selected to be on the order of or greater than three times W so that there is at least one beam width separation of each edge of the optical beam from the sides of guide layer 45. This prevents an undue amount of evanescent field from extending into the ambient atmosphere. The thickness of doped layer 42 is not critical, but if it is much less than 2 microns it will not form a good ground plane at 60 GHz electrical signal. The thickness of substrate is not critical and is generally determined by what is available from suppliers.

The main optimization parameters are the conductivities of layers 42 and 44. The doping of layer 44 affects both $V_\pi$ and velocity and thus is generally selected to be at least $10^{17}$ cm$^{-3}$ n-type.

Figure 7:
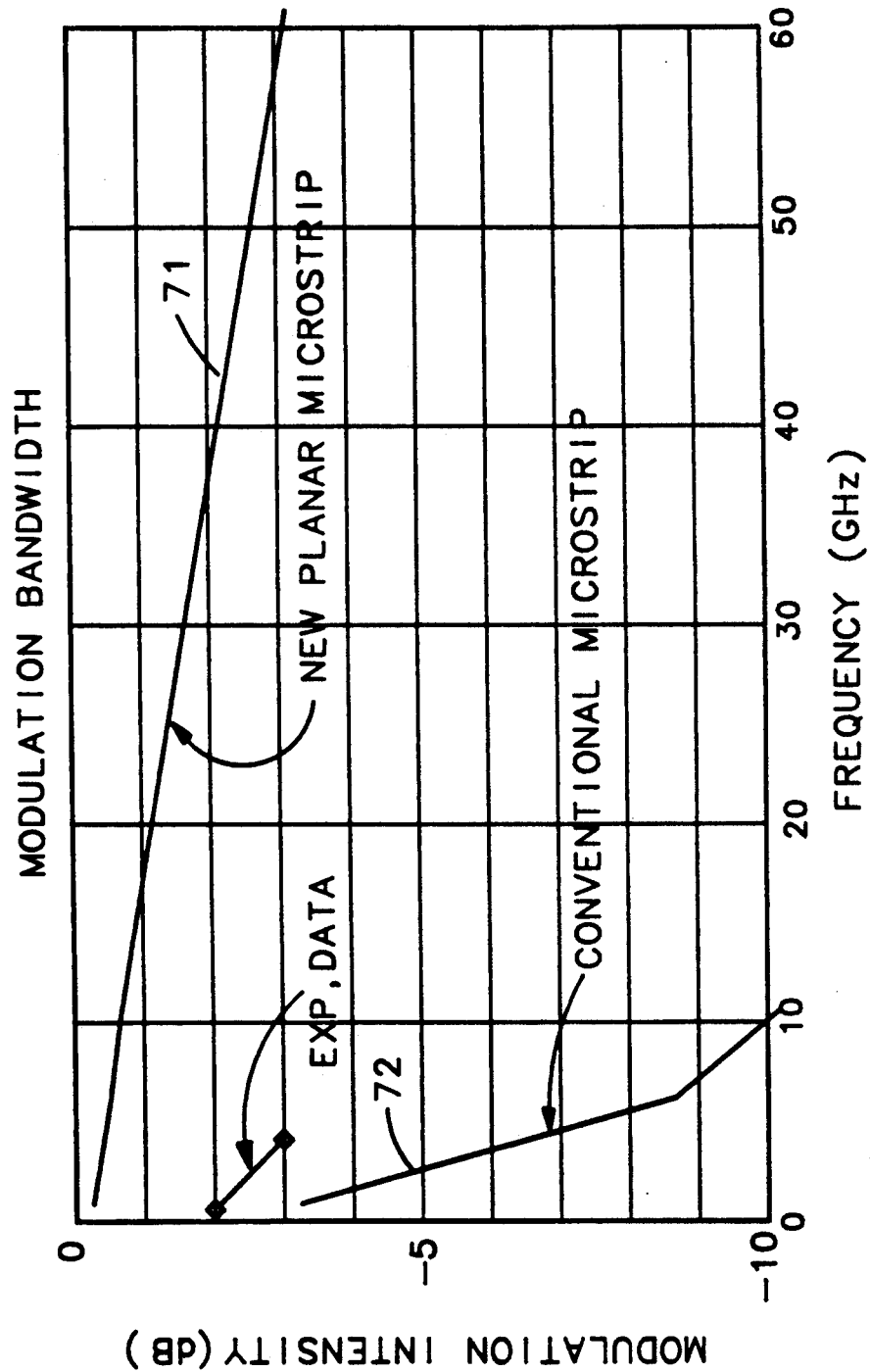
FIG. 7 compares the bandwidth of the improved modulator of FIG. 4 with the bandwidth of the conventional modulator of FIG. 1.

FIG. 7 illustrates the modulation intensity as a function of frequency of the improved modulator of FIG. 4 (curve 71) and of the conventional modulator of FIG. 1 (curve 72). Comparison of these two curves shows that the modulator of FIG. 4 exhibits a greatly increased bandwidth compared to the modulator of FIG. 1.

Figure 8:
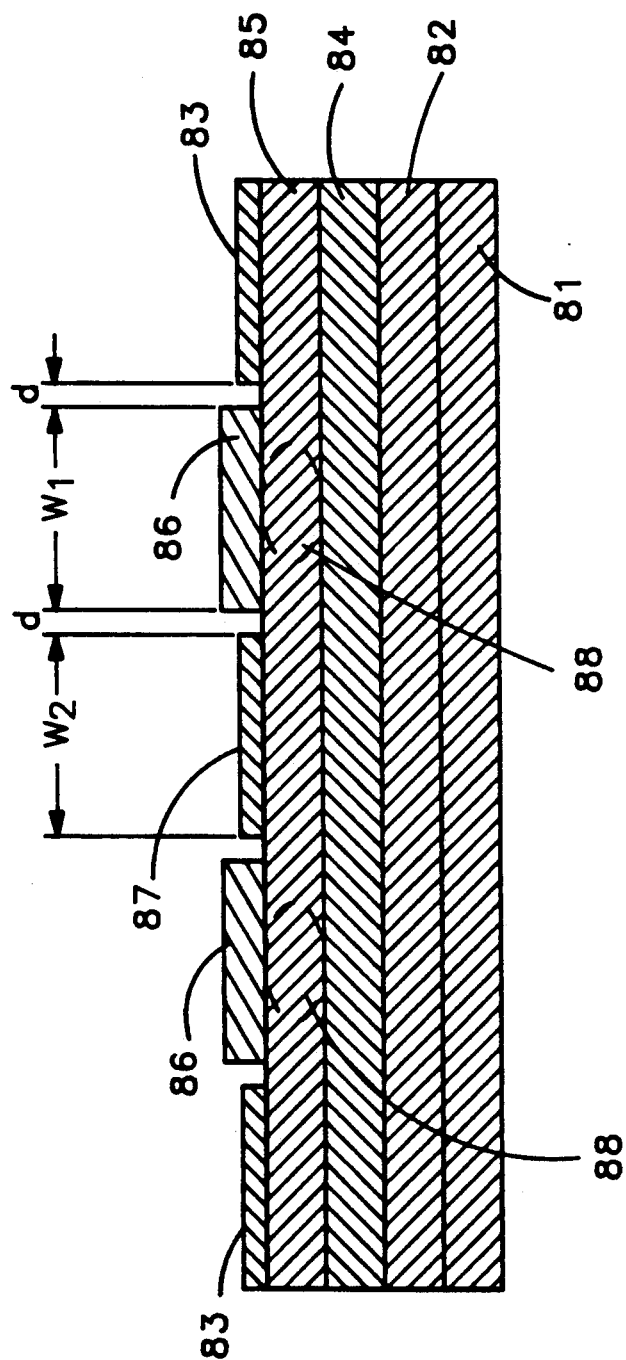
FIG. 8 is an additional travelling wave electrooptic modulator in which the phase velocities of the electrical and optical signals are substantially matched.

Another improved travelling wave electrooptic modulator is presented in FIG. 8. In this Figure and FIG. 4, corresponding elements have the same final digit. This embodiment takes advantage of the fact that half of the microwave electrical field exists in the air yielding an effective dielectric constant that is the average of the dielectric constants of guide layer 85 and air.

This embodiment consists of a semiinsulating substrate 81 of GaAs, a layer 82 of n+ doped GaAS, a buffer layer 84 of AlGaAs, a guide layer 85 of GaAs, a pair of buffer layers 86 of AlGaAs and a pair of electrodes 83. The optical beam is laterally confined to one or more regions 88 below buffer layers 86. Because electrodes 83 and 87 are substantially coplanar, these optical confinement regions 88 are located substantially midway between adjacent pairs of electrodes 83 and 87.

The parameters of layer 82 are selected to slow down the microwave electric field. The layer parameters that yield substantial equality between $v_o$ and $v_m$ are:

| | width $W_1$ = 8 microns width $W_2$ = 24 microns spacing d = 2 microns | | |
|---|---|---|---|
| Layer # | Thickness | $\epsilon_R$ | Conductivity |
| 81 | 250 | 12.85 | $10^{-6}$ |
| 82 | 2.0 | 12.85 | 100 |
| 84 | 2.0 | 12.85 | 100 |
| 85 | 3.0 | 12.85 | 50 |
| 86 | 2.0 | 12.85 | 50 | where the thickness is in microns, where $\epsilon_R$ equals the square of the index of refraction for the electrical signal and where conductivity is in ohm$^{-1}$m$^{-1}$). Intentionally doped (n-type or p-type) "conducting" layers, such as layers 42, 44, 82, 84 and 85, are used to reduce the phase velocity of the electrical signal. The conductivity of such layers can be selected to adjust the relative velocity between the optical and electrical signals. In general, in a "conducting layer" has a conductivity of at least 40 ohm$^{-1}$m$^{-1}$. As illustrated in the two embodiments above, in some embodiments the optimal conductivity can be fairly close to this bound (as in the embodiment of FIG. 8) or can be substantially larger than this lower bound (as in the embodiment of FIG. 4).

We claim:

1. A travelling wave modulator comprising:
   a substrate:
   a semiconducting, electrooptic waveguide, formed on a first side of said substrate, for propagating a travelling wave optical signal of phase velocity $v_o$;
   a pair of electrodes, consisting of a first electrode and a second electrode, located on the same side of said substrate as is formed said waveguide, formed parallel to said waveguide and positioned such that an electrical travelling wave signal travelling along said electrodes with a phase velocity $v_m$ produces an electrical field that penetrates through said waveguide;
   on the same side of said substrate as are formed said pair of electrodes, at least one intentionally doped conducting layer;
   the conductivity of said at least one intentionally doped conducting layer being selected to adjust the difference between $v_m$ and $v_o$ so that a figure of merit of the modulator is optimized.

2. A modulator as in claim 1 wherein the figure of merit is the ratio of bandwidth to voltage V and wherein this figure of merit is maximized.

3. A modulator as in claim 1 wherein the figure of merit is the difference between $v_m$ and $v_o$ and wherein this difference is substantially zero.

4. A modulator as in claim 1 wherein the figure of merit is the bandwidth and wherein this figure of merit is maximized.

5. A modulator as in claim 1 wherein said at least one intentionally doped conducting layer comprises a buffer layer in contact with said waveguide and wherein the conductivity of this layer is adjusted to optimize said figure of merit of the modulator.

6. A modulator as in claim 1 wherein said second electrode is in contact with said intentionally doped conducting layer.

7. A modulator as in claim 6 wherein said second electrode and doped conducting layer are spaced from a bottom side of said substrate by a distance $d_1$ that is smaller than a distance $d_2$ at which the first electrode is spaced from this bottom side.

8. A travelling wave modulator comprising:
   a substrate:
   a semiconducting electrooptic waveguide, formed on a first side of said substrate, for propagating a travelling wave optical signal of phase velocity $v_o$;
   a pair of electrodes, consisting of a first electrode and a second electrode, located on the same side of said substrate as is formed said waveguide, formed parallel to said waveguide and positioned such that an electrical travelling wave signal travelling along said electrodes with a phase velocity $v_m$ produces an electrical field that penetrates through said waveguide;
   on the same side of said substrate as are formed said pair of electrodes, an intentionally doped conducting buffer layer in contact with said waveguide and an intentionally doped layer in contact with said buffer layer;
   the conductivities of the buffer layer and the intentionally doped layer in contact therewith being selected to adjust the difference between $v_m$ and $v_o$ so that a figure of merit of the modulator is optimized.

* * * * *